No. 761,345. PATENTED MAY 31, 1904.
T. A. WILLARD.
STORAGE BATTERY.
APPLICATION FILED SEPT. 11, 1903.
NO MODEL.
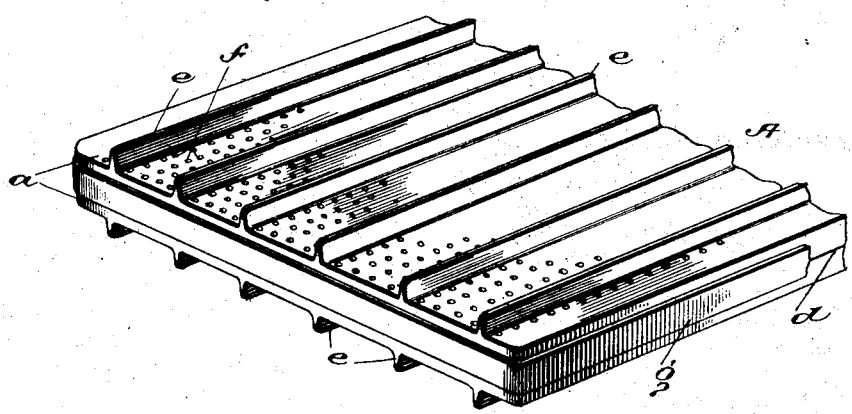
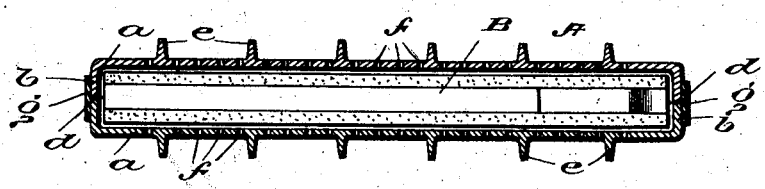
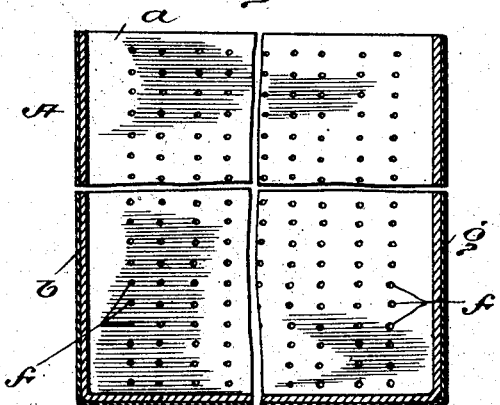
Witnesses
W. A. Williams
Jno. Imirie
Inventor
Theodor. A. Willard.

No. 761,345. Patented May 31, 1904.

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

SPECIFICATION forming part of Letters Patent No. 761,345, dated May 31, 1904.

Application filed September 11, 1903. Serial No. 172,815. (No model.)

*To all whom it may concern:*

Be it known that I, THEODORE A. WILLARD, a citizen of the United States, residing at Cleveland, in the county of Cuyahoga and State of Ohio, have invented certain new and useful Improvements in Secondary Batteries, of which the following is a specification.

My invention relates to sheaths or envelops for containing and separating the plates or electrodes of secondary batteries.

It is known that hard rubber is difficult to work, owing to the extreme care required in the handling of the same to avoid breakage, and this is especially true of sheaths or envelops for battery plates or electrodes, considerable loss accruing during the act of perforating, which is usually performed after the sheath has been given its final shape, wherefore it has been necessary to employ the best skill, labor, and materials.

The principal object of my invention is to simplify the construction and perforating of the sheath, so that less skill and care will be required in this work and cheaper grades of material employed.

To the end stated the invention consists in a sheath made in two parts properly flanged to form the sheath, with a binding-strip covering and securing the meeting edges of said parts, and vulcanized.

The nature, characteristic features, and scope of the invention will be more clearly understood from the following description, taken in connection with the accompanying drawings, forming a part hereof, wherein—

Figure 1 is a fragmentary perspective view of a sheath made in accordance with my present invention. Fig. 2 is a transverse sectional view of the sheath containing an electrode. Fig. 3 is a vertical sectional view of the sheath.

In the drawings, A represents the sheath, and, as shown in Figs. 2 and 3, it is made in two parts or sections $a$, whereof each part is coincidently provided with side and bottom flanges, designated, respectively, $b$ and $c$, so that when joined together, as represented at the seam $d$, they constitute a chambered casing or envelop. The provision of the spacing-ribs $e$ and the operation of forming the perforations $f$ are of course effected before the walls or parts $a$ are permanently associated together. It is manifest, therefore, that less skill and care are required and that cheaper compounds may be utilized to make the sheath.

In order to insure a perfect bond between the walls or parts $a$ that will withstand any strain that may be brought to bear on them by the electrode B when under the influence of the electrolyte or battery fluid, I provide a binding or reinforcing strip $g$, made of soft rubber stock, which extends entirely around the meeting edges of the flanged members or walls $a$. After being applied, as illustrated, to cover the seam $d$ the strip $g$ is vulcanized and made an integral part of the sheath.

It will be obvious to those skilled in the art to which the invention relates that modifications may be made in details without departing from the spirit and scope of the same. Hence I do not limit myself to the precise construction and arrangement of parts hereinbefore set forth, and illustrated in the accompanying drawings; but, Having described the nature and object of my invention, what I claim as new, and desire to secure by Letters Patent, is—

1. A sheath, envelop, or casing consisting of perforated and flanged members or walls having their flanges adjoining, with a binding-strip covering the meeting edges of said flanges and vulcanized, substantially as specified.

2. A sheath, envelop, or casing consisting of perforated members or walls exteriorly provided with spacing-ribs and having side and bottom flanges, the flanges of said walls adjoining each other, with a binding-strip covering the meeting edges of said flanges and vulcanized, substantially as specified.

In testimony whereof I affix my signature in presence of two witnesses.

THEODORE A. WILLARD.

Witnesses:
  G. E. RANKIN,
  J. KNEEBONE.